(12) United States Patent
Hong et al.

(10) Patent No.: US 11,450,855 B2
(45) Date of Patent: Sep. 20, 2022

(54) NEGATIVE ELECTRODE FOR LITHIUM SECONDARY BATTERY AND LITHIUM ION SECONDARY BATTERY INCLUDING THE SAME

(71) Applicant: LG CHEM, LTD., Seoul (KR)

(72) Inventors: Yeon-Suk Hong, Daejeon (KR); Seok-Koo Kim, Daejeon (KR); Sun-Kyu Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 75 days.

(21) Appl. No.: 16/646,480

(22) PCT Filed: Jan. 25, 2019

(86) PCT No.: PCT/KR2019/001124
§ 371 (c)(1),
(2) Date: Mar. 11, 2020

(87) PCT Pub. No.: WO2019/147082
PCT Pub. Date: Aug. 1, 2019

(65) Prior Publication Data
US 2020/0227753 A1 Jul. 16, 2020

(30) Foreign Application Priority Data
Jan. 26, 2018 (KR) .................... 10-2018-0009874

(51) Int. Cl.
*H01M 4/02* (2006.01)
*H01M 4/62* (2006.01)
(Continued)

(52) U.S. Cl.
CPC ......... *H01M 4/628* (2013.01); *H01M 4/0404* (2013.01); *H01M 4/139* (2013.01);
(Continued)

(58) Field of Classification Search
CPC ..................................................... H01M 4/628
See application file for complete search history.

(56) References Cited

U.S. PATENT DOCUMENTS

2005/0266150 A1  12/2005  Yong et al.
2006/0121345 A1   6/2006  Yasuda et al.
(Continued)

FOREIGN PATENT DOCUMENTS

CN    110419126 A    11/2019
EP    3 584 860 A2   12/2019
(Continued)

OTHER PUBLICATIONS

Translation of document.*
(Continued)

*Primary Examiner* — Austin Murata
(74) *Attorney, Agent, or Firm* — Birch, Stewart, Kolasch & Birch, LLP

(57) ABSTRACT

An electrode including a lithium diffusion rate-controlling layer and a lithium layer stacked successively on the surface thereof, and a method for manufacturing the same are disclosed. The electrode includes: a current collector; an electrode active material layer formed on the surface of the current collector; a lithium diffusion rate-controlling layer formed on the surface of the electrode active material layer; and a lithium layer containing a lithium metal ingredient and formed on the surface of the lithium diffusion rate-controlling layer.

8 Claims, 6 Drawing Sheets

FIG. 2a

(51) Int. Cl.
  *H01M 4/04*      (2006.01)
  *H01M 4/139*     (2010.01)
  *H01M 4/48*      (2010.01)
  *H01M 10/0525*   (2010.01)
  *H01M 10/058*    (2010.01)

(52) U.S. Cl.
  CPC ......... *H01M 4/483* (2013.01); *H01M 10/058* (2013.01); *H01M 10/0525* (2013.01); *H01M 2004/027* (2013.01)

(56) References Cited

U.S. PATENT DOCUMENTS

| | | |
|---|---|---|
| 2008/0248396 A1 | 10/2008 | Jung et al. |
| 2017/0338480 A1 | 11/2017 | Kim et al. |
| 2020/0295358 A1 | 9/2020 | Chae et al. |

FOREIGN PATENT DOCUMENTS

| | | | |
|---|---|---|---|
| JP | 10-208776 | A | 8/1998 |
| JP | H10-208776 | * | 8/1998 |
| JP | 2007-273459 | A | 10/2007 |
| JP | 4329357 | B2 | 9/2009 |
| JP | 2010-160983 | A | 7/2010 |
| KR | 10-2008-0090655 | A | 10/2008 |
| KR | 10-2009-0058592 | A | 6/2009 |
| KR | 10-2014-0026806 | A | 3/2014 |
| KR | 10-2016-0033608 | A | 3/2016 |
| KR | 10-2016-0094652 | A | 8/2016 |
| KR | 10-2017-0052838 | A | 5/2017 |

OTHER PUBLICATIONS

Supplementary European Search Report issued in Application No. 19743672.8 dated Oct. 21, 2020.
International Search Report for PCT/KR2019/001124 dated May 13, 2019.

* cited by examiner

NEGATIVE ELECTRODE FOR LITHIUM SECONDARY BATTERY AND LITHIUM ION SECONDARY BATTERY INCLUDING THE SAME

TECHNICAL FIELD

The present disclosure relates to a negative electrode for a lithium secondary battery and a lithium ion secondary battery including the same. The present application claims priority to Korean Patent Application No. 10-2018-0009874 filed on Jan. 26, 2018 in the Republic of Korea.

BACKGROUND ART

Recently, as mobile instruments, personal computers, electric motors and contemporary capacitor devices have been developed and popularized, high-capacity energy sources have been in increasingly in demand. A typical example of such energy sources includes a lithium secondary battery. Silicon has been given many attentions as a negative electrode material for a next-generation type non-aqueous electrolyte secondary battery, since it has a capacity (about 4200 mAh/g) corresponding to about 10 times or more of the capacity (theoretical capacity: 372 mAh/g) of a graphite-based material used conventionally as a negative electrode material. Thus, it has been suggested that a metal oxide, such as silicon oxide or tin oxide, which is alloyed with lithium to show high theoretical capacity, as a novel negative electrode active material substituting for a carbonaceous material. However, such metal oxides undergo a change in volume during charge/discharge so that cracking and deterioration occur in the active material, resulting in degradation of cycle life undesirably. To solve the problem, there has been an attempt to carry out a pre-lithiation process of inserting lithium preliminarily to metal oxides. As an example of such pre-lithiation, there has been used a pre-lithiation process including stacking (laminating) lithium metal foil on (with) the surface of a negative electrode active material to form an electrode assembly, and then injecting an electrolyte thereto so that lithium may be diffused into the negative electrode active material layer, according to the related art. However, when the time required for injecting an electrolyte after the lamination of lithium metal foil is delayed during the process, lithium may be diffused non-homogeneously into the negative electrode active material layer to cause an increase in resistance, or lithium may be diffused to the air to cause a loss of lithium content. Therefore, there has been a continuous need for studying novel negative electrode active materials.

DISCLOSURE

Technical Problem

The present disclosure is directed to providing a novel pre-lithiation method of a negative electrode for a lithium ion battery, a negative electrode obtained from the method, and a lithium ion secondary battery including the negative electrode. These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided an electrode including a lithium diffusion rate-controlling layer and a lithium layer stacked successively on the surface thereof, and a method for manufacturing the same. According to the first embodiment of the present disclosure, there is provided an electrode including: a current collector; an electrode active material layer formed on the surface of the current collector; a lithium diffusion rate-controlling layer formed on the surface of the electrode active material layer; and a lithium layer containing a lithium metal ingredient and formed on the surface of the lithium diffusion rate-controlling layer, wherein the lithium diffusion rate-controlling layer includes a polymer material in an amount of 80 wt % or more based on 100 wt % of the lithium diffusion rate-controlling layer.

According to the second embodiment of the present disclosure, there is provided the electrode as defined in the first embodiment, wherein the polymer material includes a swellable polymer material, an elutable polymer material or both.

According to the third embodiment of the present disclosure, there is provided the electrode as defined in the second embodiment, wherein the swellable polymer material shows a swelling degree of 3 or more, as determined by the following Formula 1:

$$\text{Swelling degree} = \{(Ws-Wd)/Wd\} \quad \text{[Formula 1]}$$

In Formula 1, Wd represents the weight of a polymer material before it is dipped in an electrolyte, and Ws represents the weight of the polymer material 24 hours after it is dipped.

According to the fourth embodiment of the present disclosure, there is provided the electrode as defined in the second embodiment, wherein the elutable polymer material shows a solubility to a carbonate solvent of 1 g/100 mL or more at room temperature (ranging from about 20° C. to 35° C.).

According to the fifth embodiment of the present disclosure, there is provided the electrode as defined in any one of the above-described embodiments, wherein the electrode active material layer includes an electrode active material, a binder and a conductive material.

According to the sixth embodiment of the present disclosure, there is provided the electrode as defined in any one of the above-described embodiments, wherein the electrode active material includes a metal (metalloid) oxide, and the metal (metalloid) oxide includes Si, Sn, Al, Sb, Bi, As, Ge, Pb, Zn, Cd, In, Ti, Ga, or an alloy containing two or more of them.

According to the seventh embodiment of the present disclosure, there is provided the electrode as defined in any one of the above-described embodiments, wherein the metal (metalloid) oxide includes $SiO_x$ ($0<x\leq2$), SnO, $SnO_2$, or a mixture of at least two of them.

In another aspect of the present disclosure, there is provided a lithium secondary battery including the electrode. According to the eighth embodiment of the present disclosure, there is provided a battery including a negative electrode, a positive electrode, a separator interposed between the negative electrode and the positive electrode, and an electrolyte, wherein the negative electrode is defined in any one of the above-described embodiments.

In still another aspect of the present disclosure, there is provided a method for manufacturing a lithium ion secondary battery. According to the ninth embodiment of the present disclosure, there is provided a method for manufacturing a lithium ion secondary battery, including the following steps (S11) to (S15) of:

(S11) forming a negative electrode active material layer on the surface of a current collector;

(S12) stacking a lithium foil layer and a lithium diffusion rate-controlling layer successively on the surface of a release sheet;

(S13) laminating the resultant product of (S11) with that of (S12) in such a manner that the negative electrode active material layer may face the lithium diffusion rate-controlling layer to prepare a negative electrode;

(S14) forming an electrode assembly including the negative electrode prepared from step (S13); and (S15) injecting an electrolyte into the electrode assembly.

According to the tenth embodiment of the present disclosure, there is provided a method substituting for the method as defined in the ninth embodiment, the method including steps (S21) to (S24) of:

(S21) forming a negative electrode active material layer on the surface of a current collector;

(S22) stacking a lithium diffusion rate-controlling layer and a lithium foil layer successively on the surface of the negative electrode active material layer to provide a negative electrode;

(S23) forming an electrode assembly including the negative electrode prepared from step (S22); and (S24) injecting an electrolyte into the electrode assembly.

Advantageous Effects

The negative electrode according to the present disclosure is provided with a lithium diffusion rate-controlling layer between lithium foil and a negative electrode active material layer. Thus, it is possible to control the lithium diffusion rate during the pre-lithiation step. In addition, it is possible to inhibit a loss of lithium and side reactions of lithium, and thus to improve cycle characteristics.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, the shapes, sizes, scales or proportions of some elements in the drawings may be exaggerated for the purpose of clearer description.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

As used herein, the expression 'one portion is connected to another portion' covers not only 'a portion is directly connected to another portion' but also 'one portion is connected indirectly to another portion' by way of the other element interposed between them.

Throughout the specification, the expression 'a part includes an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

The present disclosure relates to a negative electrode for an electrochemical device and an electrochemical device including the same. Herein, the electrochemical device includes any device which carries out electrochemical reaction, and particular examples thereof include all types of primary batteries, secondary batteries, fuel cells, solar cells or capacitors. Particularly, among the secondary batteries, lithium secondary batteries, including lithium metal secondary batteries, lithium ion secondary batteries, lithium polymer secondary batteries or lithium ion polymer batteries, are preferred.

Hereinafter, the negative electrode according to the present disclosure will be explained in more detail.

Negative Electrode

Figure 1:
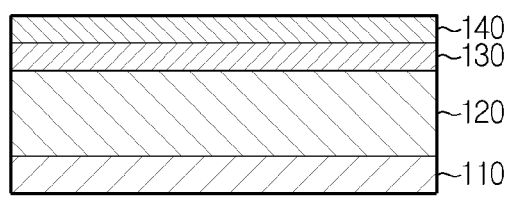
FIG. 1 is a schematic view illustrating the structure of a negative electrode according to an embodiment of the present disclosure.

FIG. 1 is a schematic view illustrating the section of the negative electrode according to an embodiment of the present disclosure. Referring to FIG. 1, the negative electrode according to the present disclosure includes: a current collector; a negative electrode active material layer formed on the surface of the current collector; a lithium diffusion rate-controlling layer formed on the surface of the electrode active material layer; and a lithium layer containing a lithium metal ingredient and formed on the surface of the lithium diffusion rate-controlling layer.

In general, the negative electrode current collector is formed to have a thickness of 3-500 μm. The negative electrode current collector is not particularly limited, as long as it causes no chemical change in the corresponding battery and has conductivity. Particular examples of the negative electrode current collector may include copper; stainless steel; aluminum; nickel; titanium; baked carbon; aluminum or stainless steel surface-treated with carbon, nickel, titanium or silver; or the like.

The negative electrode active material layer includes a negative electrode active material, a binder and a conductive material. The negative electrode according to the present disclosure is obtained by applying a mixture containing a negative electrode active material, a conductive material and a binder onto the current collector, followed by drying. If desired, the mixture may further include a filler.

According to an embodiment of the present disclosure, the negative electrode active material includes a metal (metalloid) oxide, and the metal (metalloid) oxide may be provided in the form of particles or powder including the particles. The metal (metalloid) oxide may include Si, Sn, Al, Sb, Bi, As, Ge, Pb, Zn, Cd, In, Ti, Ga, or an alloy containing at least two of them. Preferably, the negative electrode active material may include $SiO_x$ ($0<x\leq2$), SnO, $SnO_2$, or a mixture of at least two of them.

Meanwhile, according to an embodiment of the present disclosure, the metal oxide may be provided with a shell portion containing a carbonaceous material at least partially on the surface of the particles. The carbonaceous material may be bound to, attached to or coated on the surface of the metal (metalloid) oxide particles. The carbonaceous material may include crystalline carbon, natural graphite, artificial graphite, kish graphite, graphitized carbon fibers, graphitized mesocarbon microbeads, amorphous carbon, or a mixture containing at least two of them. In addition, the graphite may be one obtained by graphitization of soft carbon, hard carbon, pyrolytic carbon, mesophase pitch based carbon fibers, mesocarbon microbeads, mesophase pitches, petroleum or coal tar pitch derived cokes, activated carbon, or a mixture of at least two of them.

According to a preferred embodiment of the present disclosure, the particle diameter $D_{50}$ at 50% in the volume accumulated particle size distribution of the metal oxide is 2-5 μm. In addition, the particle diameter $D_{90}$ at 90% in the volume accumulated particle size distribution of the metal oxide is 25 μm or less, preferably 15 μm or less, and more preferably 10 μm or less. Further, the maximum particle diameter in the volume accumulated particle size distribution is 35 μm or less, preferably 25 μm or less. The 50% particle diameter, 90% particle diameter and the maximum particle diameter in the volume accumulated particle size distribution may be obtained from the accumulated frequency as determined by using a laser diffraction particle size distribution analyzer available from Nikkiso Company, for example.

The binder is an ingredient which assists binding between the electrode active material and the conductive material and binding to the current collector. In general, the binder is added in an amount of 1-50 wt % based on the total weight of the electrode mixture. High-molecular weight polyacrylonitrile-co-acrylic acid may be used as a binder but the scope of the present disclosure is not limited thereto. Other examples of the binder include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butyrene rubber, fluororubber, various copolymers, or the like.

The conductive material is an ingredient causing no chemical change in the corresponding battery. Particular examples of the conductive material include: graphite, such as natural graphite or artificial graphite; carbon black, such as carbon black, acetylene black, Ketjen black, carbon nanotubes, carbon nanofibers, channel black, furnace black, lamp black or thermal black; conductive fibers, such as carbon fibers or metallic fibers; metal powder, such as fluorocarbon, aluminum or nickel powder; conductive whisker, such as zinc oxide or potassium titanate; conductive metal oxide, such as titanium oxide; and conductive materials, such as polyphenylene derivatives.

Lithium Diffusion Rate-Controlling Layer

According to an embodiment of the present disclosure, a lithium diffusion rate-controlling layer is provided on the surface of the negative electrode active material layer, and the lithium diffusion rate-controlling layer is interposed between the negative electrode active material layer and the lithium layer as described hereinafter to control (reduce) the lithium diffusion rate from the lithium layer and to assist diffusion of lithium into the negative electrode active material layer with homogeneous distribution.

As described hereinafter, pre-lithiation is carried out upon the injection of an electrolyte and/or the initial charge/discharge according to the present disclosure. Herein, the lithium diffusion rate-controlling layer functions as a diffusion-preventing layer which prevents lithium diffusion, until the injection of an electrolyte and/or the initial charge/discharge. Meanwhile, after carrying out pre-lithiation, the lithium diffusion rate-controlling layer may be removed by elution with an electrolyte, or may functions as an insulation layer between a negative electrode and a positive electrode, if it remains.

According to an embodiment of the present disclosure, the lithium diffusion rate-controlling layer may include a polymer material. Particular examples of the polymer material include any one selected from the group consisting of polyvinylidene fluoride (PVdF), polyvinyl chloride, polyvinylidene fluoride-co-hexafluoropropylene, polyvinylidene fluoride-co-trichloroethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cyanoethylpullulan, cyanoethylpolyvinyl alcohol, cyanoethyl cellulose, cyanoethyl sucrose, pullulan and carboxymethyl cellulose, or a mixture of at least two of them, but are not limited thereto.

According to an embodiment of the present disclosure, the lithium diffusion rate-controlling layer may include the polymer material in an amount of 80 wt % or more, or 90 wt % or more, based on 100 wt % of the lithium diffusion rate-controlling layer.

According to an embodiment of the present disclosure, the lithium diffusion rate-controlling layer may use a material which allows electric current application between the lithium layer and the negative electrode under the range of activation pressure applied during the initial charge/discharge. For this purpose, the lithium diffusion rate-controlling layer may include a swellable polymer material among the polymer materials. Non-limiting examples of the swellable polymer material include polyacrylonitrile (PAN), polyacrylic acid, polyacrylic amide, polyvinyl alcohol, polyvinyl pyrrolidone, polyethyl glycol, polyvinylidene fluoride (PVdF), or the like, and the lithium diffusion rate-controlling layer may include at least one of them. According to an embodiment of the present disclosure, the swellable polymer material may have a swelling degree of at least 3, at least 5, or at least 10. Thus, the lithium diffusion rate-controlling layer including the swellable polymer material is swelled, as it absorbs an electrolyte, and may be compressed to a thickness sufficient to apply electric current by applying a predetermined level of pressure to the battery. Herein, the thickness of the lithium diffusion rate-controlling layer may be within a suitable range depending on the activation pressure applied during the initial charge/discharge. For example, the activation pressure applied generally during the initial charge/discharge is about 38 KPa. Considering such a pressure condition, the lithium diffusion rate-controlling layer may have a thickness of 3 µm or less, 2.5 µm or less, or 2 µm or less, preferably. When the lithium diffusion rate-controlling layer has an excessively large thickness, electric current application is interrupted between the lithium layer and the negative electrode, and thus lithium cannot be diffused smoothly into the negative electrode. Meanwhile, when the lithium diffusion rate-controlling layer has an excessively small thickness, electric current is applied after attaching lithium foil and before carrying out a pre-lithiation step, and thus the layer cannot functions as a diffusion-controlling layer. In addition, lithiation may occur non-homogeneously. Particularly, lithiation may be concentrated locally to the electrode surface, and thus the electrode active material may be detached at the portion lithiated excessively as compared to the other portions. Considering this, the lithium diffusion rate-controlling layer may have a thickness of 0.1 µm or more, preferably.

Meanwhile, according to an embodiment of the present disclosure, the swelling degree may be calculated by using the following Formula 1:

Swelling degree=$\{(Ws-Wd)/Wd\}$ [Formula 1]

In Formula 1, Wd represents the weight of a polymer material before it is dipped in an electrolyte, and Ws represents the weight of the polymer material 24 hours after it is dipped. There is no particular limitation in the electrolyte, as long as it is an electrolyte used conventionally for manufacturing a battery in the art. Most preferably, the swelling degree may be determined by using the same electrolyte as used actually for manufacturing a battery. For example, the electrolyte may include 1 mol/L of $LiPF_6$ added to a mixture containing ethylene carbonate and ethyl methyl carbonate at a weight ratio of 3:7.

Meanwhile, according to an embodiment of the present disclosure, the swelling degree may be determined under such a condition that pH of the electrolyte is about 3-5.

According to an embodiment of the present disclosure, the lithium diffusion rate-controlling layer may include an elutable polymer material, which is removed by being dissolved in a solvent, alone or in combination with the above-mentioned swellable polymer material (material which allows application of electric current under a predetermined pressure). According to the present disclosure, when the lithium diffusion rate-controlling layer is removed by being dissolved in a solvent, it is not required to consider a range of pressure applied upon the initial charge/discharge. This is favorable to processability. Meanwhile, in this case, it is preferred that ingredients eluted from the polymer material of the lithium diffusion rate-controlling layer are not oxidized or reduced at the negative electrode or positive electrode. According to an embodiment of the present disclosure, the elutable polymer material may include an ingredient with high solubility in the electrolyte, considering the electrolyte ingredient used actually for manufacturing a battery. Since a polymer material shows elutability or swellability depending on its molecular weight, it is possible to select an adequate polymer material depending on a desired property from elutability and swellability, and to apply it to the lithium diffusion rate-controlling layer. According to an embodiment of the present disclosure, the elutable polymer material may have a solubility of 1 g/100 mL or more to a carbonate solvent at room temperature (about 20-35° C.).

It is possible for the negative electrode body to accomplish homogeneous lithiation by virtue of the lithium diffusion rate-controlling layer as described above. In other words, the lithium diffusion rate-controlling layer prevents generation of non-homogeneous lithiation by inhibiting lithium diffusion until the injection of an electrolyte. In addition, after the electrolyte infiltrates into the electrode and the electrode is impregnated homogeneously with the electrolyte, the lithium diffusion rate-controlling layer allows lithium to be diffused well into the electrode by means of the electrolyte to accomplish homogeneous lithiation even in the inner part of the electrode.

Lithium Layer

The lithium layer is used as a source for lithiation of the negative electrode active material contained in the negative electrode active material layer. As a predetermined period of time passes after the injection of the electrolyte, a predetermined amount of the lithium layer is moved into the negative electrode active material layer. Even after lithiation is completed to a certain degree, the remaining amount of the lithium layer may remain on the surface of the lithium diffusion rate-controlling layer. The lithium layer includes lithium metal. According to an embodiment of the present disclosure, the lithium layer may be formed by electroplating, electrodeposition or chemical vapor deposition, or by lamination of lithium metal foil with the lithium diffusion rate-controlling layer through compression.

Method for Manufacturing Negative Electrode

According to an embodiment of the present disclosure, the negative electrode is prepared as follows. First, a negative electrode active material layer is formed on the surface of a current collector (S11). Next, a release sheet is prepared, and a lithium layer and a lithium diffusion rate-controlling layer are stacked successively on the surface of the release sheet (S12). According to the present disclosure, the release sheet is not particularly limited, as long as it can be removed easily from a laminate formed by stacking the lithium layer and the lithium diffusion rate-controlling layer successively.

Figure 2A:
FIG. 2a and FIG. 2b show the method for manufacturing a negative electrode according to an embodiment of the present disclosure.
Figure 2A:
Figure 2A:
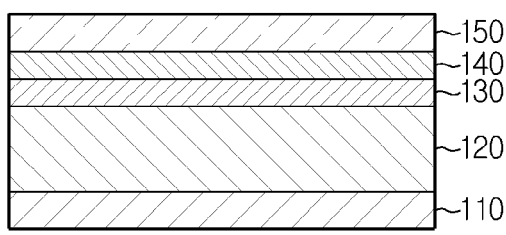
Figure 2A:
Figure 2A:
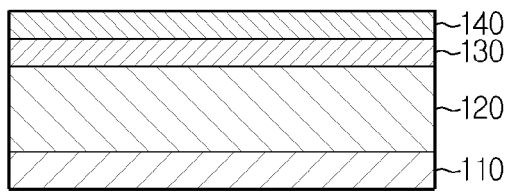

For example, the release sheet may be a resin film layer made of polyethylene terephthalate. The laminate is formed by laminating lithium metal foil with the surface of the release sheet, and then forming the lithium diffusion rate-controlling layer on the surface of lithium metal foil. For example, the lithium diffusion rate-controlling layer may be formed by applying a polymer solution prepared by dissolving an adequate polymer resin, such as PMMA, in a solvent to the surface of lithium metal foil, followed by drying, as described above. Otherwise, the lithium diffusion rate-controlling layer may be formed by preparing a separate polymer thin film and laminating the film with lithium metal foil. Then, the resultant product of step (S11) is laminated with that of step (S12) in such a manner that the negative electrode active material layer may face the lithium diffusion rate-controlling layer to obtain a negative electrode (S13). FIG. 2a is a schematic view illustrating the above-described method for manufacturing a negative electrode.

In a variant, the negative electrode according to the present disclosure may be obtained by forming a lithium diffusion rate-controlling layer on the surface of a negative electrode active material layer, without using a release sheet, and then forming a lithium layer on the surface of the lithium diffusion rate-controlling layer. Herein, formation of the lithium layer and that of the lithium diffusion rate-controlling layer may refer to the method described hereinabove.

Figure 2B:
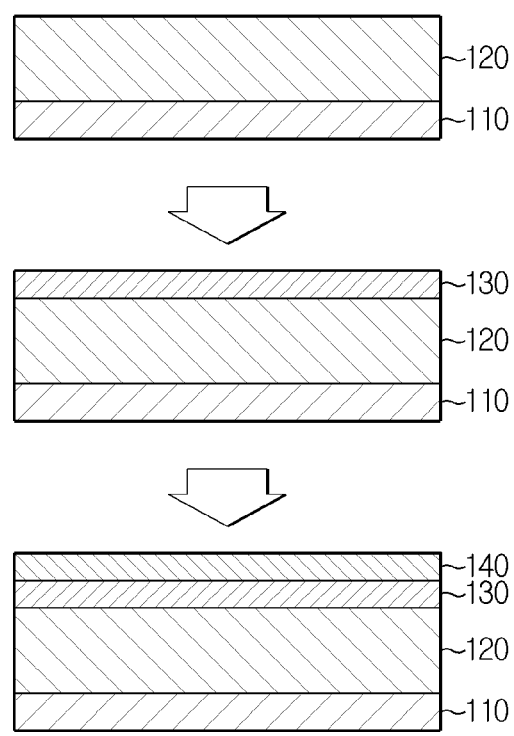

FIG. 2b is a schematic view illustrating the above-described method for manufacturing a negative electrode.

According to an embodiment of the present disclosure, the negative electrode may be dipped in the polymer solution prepared as described above and dried to form the lithium diffusion rate-controlling layer even in the inner part of the electrode. Then, a lithium layer may be formed on the surface of the electrode impregnated with the lithium diffusion rate-controlling layer. In this case, even the surface of the electrode active material present in the inner part of the electrode is coated with the lithium diffusion rate-controlling layer, thereby preventing lithium diffusion. In this case, the polymer material used for the lithium diffusion rate-controlling layer may be an elutable polymer material, preferably.

Lithiation

According to an embodiment of the present disclosure, lithiation of the negative electrode is carried out in a step of injecting an electrolyte and/or the initial charge/discharge step, after manufacturing a battery. Herein, at least a part of the negative electrode active material contained in the negative electrode active material layer is lithiated. According to an embodiment of the present disclosure, the battery includes an electrode assembly including a negative electrode, a positive electrode and a separator interposed between the negative electrode and the positive electrode. Such a battery may be obtained by inserting the electrode assembly to an adequate casing material and injecting an electrolyte thereto, followed by sealing.

According to the present disclosure, lithiation may be carried out by injecting the electrolyte. In other words, once the electrolyte is injected, the electrode assembly including constitutional elements, such as an electrode, is impregnated with the electrolyte. At that time, lithium may be diffused to the electrode while the lithium diffusion rate-controlling layer is eluted and removed.

After injecting the electrolyte, electric current is applied to the battery for the first time to carry out initial charge/discharge (formation), thereby activating the battery. The formation step may be carried out under the application of a predetermined pressure to the battery. As described above, when using a material which allows application of electric current through compression under a predetermined pressure, lithium may be diffused into the electrode trough the formation step under a predetermined pressure.

The negative electrode active material, particularly the metal (metalloid) oxide, contained in the negative electrode active material layer may form a complex with lithium to form an alloy. In addition, a part of lithium is intercalated to the crystal structure of the negative electrode active material. Further, lithium ions may be transported well even into the electrode by means of the electrolyte during the lithiation. Thus, it is possible to carry out homogeneous lithiation over the whole electrode body.

According to the present disclosure, since the negative electrode active material layer is laminated with the lithium layer with the lithium diffusion rate-controlling layer interposed therebetween, lithium diffusion is prevented in this state so that little lithiation is carried out. However, as described above, substantially all of lithiation may be carried out after manufacturing an electrode assembly and injecting an electrolyte to the electrode assembly and/or in the initial charge/discharge step.

Meanwhile, it is preferred that the initial charge/discharge may be carried out optionally while a predetermined pressure is applied to the battery in order to apply electric current between the lithium diffusion rate-controlling layer and the negative electrode. Then, lithiation may be carried out continuously, as long as lithium metal remains in the lithium layer, and may be affected (e.g. accelerated) by the charge/discharge of the battery.

Secondary Battery

In another aspect, there is provided a lithium secondary battery including a negative electrode, a positive electrode, a separator interposed between the negative electrode and the positive electrode, and an electrolyte, wherein the negative electrode has the above-described constitutional characteristics.

The positive electrode may be obtained by applying and drying a mixture of a positive electrode active material, a conductive material and a binder on a positive electrode current collector. If desired, the mixture may further include a filler. Particular examples of the positive electrode active material include, but are not limited to: layered compounds such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); $LiMn_2O_4$ in which Li is partially substituted with an alkaline earth metal ion; disulfide compounds; $Fe_2(MoO_4)_3$; or the like.

The conductive material, current collector and the binder used for the positive electrode may refer to those described hereinabove with reference to the negative electrode.

The separator is interposed between the positive electrode and the negative electrode, and may be an insulating thin film having high ion permeability and mechanical strength. In general, the separator may have a pore diameter and thickness of 0.01-10 μm and 5-300 μm, respectively. Particular examples of the separator include: olefinic polymers, such as polypropylene having chemical resistance and hydrophobicity; sheets or non-woven webs made of glass fibers or polyethylene; or the like. Meanwhile, the separator may further include a porous layer containing a mixture of inorganic particles with a binder resin, on the outermost surface thereof.

According to the present disclosure, the electrolyte includes an organic solvent and a predetermined amount of lithium salt. Particular examples of the organic solvent include propylene carbonate (PC), ethylene carbonate (EC), butylene carbonate (BC), diethyl carbonate (DEC), dimethyl carbonate (DMC), dipropyl carbonate (DPC), methyl propionate (MP), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (GBL), flouroethylene carbonate (FEC), methyl formate, ethyl formate, propyl formate, methyl acetate, ethyl acetate, propyl acetate, pentyl acetate, methyl propionate, ethyl propionate, butyl propionate, or a combination thereof. In addition, halogen derivatives of the organic solvents and linear ester compounds may also be used. The lithium salt is an ingredient easily soluble in the non-aqueous electrolyte, and particular examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, CH$_3$SO$_3$Li, (CF$_3$SO$_2$)$_2$NLi, lithium chloroborate, lower aliphatic lithium carboxylate, lithium tetraphenylborate, imides, or the like.

The secondary battery according to the present disclosure may be obtained by receiving and sealing an electrode assembly including positive electrodes and negative electrodes stacked alternatively with separators interposed therebetween in a casing material, such as a battery casing, together with an electrolyte. Any conventional methods for manufacturing a secondary battery may be used with no particular limitation.

In another aspect, there are provided a battery module including the secondary battery as a unit cell, and a battery pack including the battery module. Since the battery module and battery pack include a secondary battery which shows excellent quick charging characteristics at a high loading amount, they may be used as power sources for electric vehicles, hybrid electric vehicles, Plug-In hybrid electric vehicles and power storage systems.

Meanwhile, reference will be made to description about elements used conventionally in the field of a battery, particularly a lithium secondary battery, about other battery elements not described herein, such as a conductive material.

Hereinafter, the present disclosure will be explained in detail with reference to Examples. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

EXAMPLES

1. Manufacture of Negative Electrode (1) Example 1

SiO (D$_{50}$: 3.2 µm) was mixed with artificial graphite at a weight ratio of 3:7 and the resultant mixture was used as a negative electrode active material. The negative electrode active material, styrene butadiene rubber (SBR) as a binder, carboxymethyl cellulose (CMC) and acetylene black were introduced to water at a weight ratio of 93:3:1.5:2.5 to prepare negative electrode slurry. The slurry was coated uniformly on 10 µm copper foil under the condition of a drying temperature of 90° C. and a coating rate of 0.2 m/min. The coated electrode was pressed to a porosity of 30%, thereby satisfying a target thickness. Then, the electrode was dried in a vacuum oven at 180° C. for 12 hours.

The resultant negative electrode was coated with 1 wt % polymethyl methacrylate (PMMA, Mw: 890 k) solution (in anisole) through a dip coating process and dried in a vacuum oven at 60° C. for 5 hours to remove anisole as a solvent. In this manner, a lithium diffusion rate-controlling layer containing PMMA was formed on the surface of the negative electrode. The lithium diffusion rate-controlling rate had a thickness of 2 µm or less. Then, 10 µm lithium foil was transferred to the negative electrode coated with the lithium diffusion rate-controlling layer to obtain a negative electrode. Herein, PMMA showed a swelling degree of 5.3 under the condition of pH 4. The swelling degree was calculated according to the above Formula 1 and the electrolyte used herein was prepared by mixing ethylene carbonate with ethyl methyl carbonate at a weight ratio of 3:7 and adding LiPF$_6$ thereto in an amount of 1 mol/L.

(2) Example 2

A negative electrode was obtained in the same manner as Example 1 and the negative electrode was stored under vacuum for 3 days.

(3) Comparative Example 1

SiO (D$_{50}$: 3.2 µm) was mixed with artificial graphite at a weight ratio of 3:7 and the resultant mixture was used as a negative electrode active material. The negative electrode active material, styrene butadiene rubber (SBR) as a binder, carboxymethyl cellulose (CMC) and acetylene black were introduced to water at a weight ratio of 93:3:1.5:2.5 to prepare negative electrode slurry. The slurry was coated uniformly on 10 µm copper foil under the condition of a drying temperature of 90° C. and a coating rate of 0.2 m/min. The coated electrode was pressed to a porosity of 30%, thereby satisfying a target thickness. Then, the electrode was dried in a vacuum oven at 180° C. for 12 hours. After that, 10 µm lithium foil was transferred to the resultant negative electrode to obtain a negative electrode.

(4) Comparative Example 2

A negative electrode was obtained in the same manner as Comparative Example 1 and the negative electrode was stored under vacuum for 3 days.

(5) Comparative Example 3

PMMA (Mw: 890 k), carbon black and anisole were mixed at a weight ratio of 2:30:68 and the resultant mixture was blended by using a paste mixer at a speed of 1500 rpm for 15 minutes. The resultant mixture was coated on the surface of the electrode obtained in the same manner as Comparative Example 1 through a dip coating process and dried in a vacuum oven at 60° C. for 5 hours to form a lithium diffusion rate-controlling layer on the surface of the electrode. Then, lithium foil (thickness 10 µm) was transferred to the surface of the lithium diffusion rate-controlling layer to obtain a negative electrode, and the negative electrode was stored under vacuum for 3 days.

(6) Comparative Example 4

An electrode was obtained in the same manner as Comparative Example 3, except that Al$_2$O$_3$ powder was used instead of carbon black, and the electrode was stored under vacuum for 3 days.

2. Manufacture of Battery

Each of the negative electrodes according to Examples and Comparative Examples was used to obtain a battery. As a counter electrode for the negative electrode, 100 µm lithium foil was used to obtain a coin cell including a negative electrode/separator (porous film made of polypropylene (20 µm, Celgard Co.)/lithium foil. As an electrolyte, 1 mol/L of LiPF$_6$ added to a mixture containing ethylene carbonate and ethylmethyl carbonate at a weight ratio of 3:7 was used.

Each of the batteries according to Examples and Comparative Examples was subjected to the initial discharge at 0.1 C to 1.5V in a constant current (CC) mode. Then, charge was carried out in a CC/constant voltage (CV) mode under the condition of 0.1 C, 5 mV and 0.005 C cut, and discharge was carried out at 0.1 C to 1.5V in a CC mode to calculate irreversible capacity upon the initial charge/discharge.

3. Determination of Lithiation

Figure 3A:
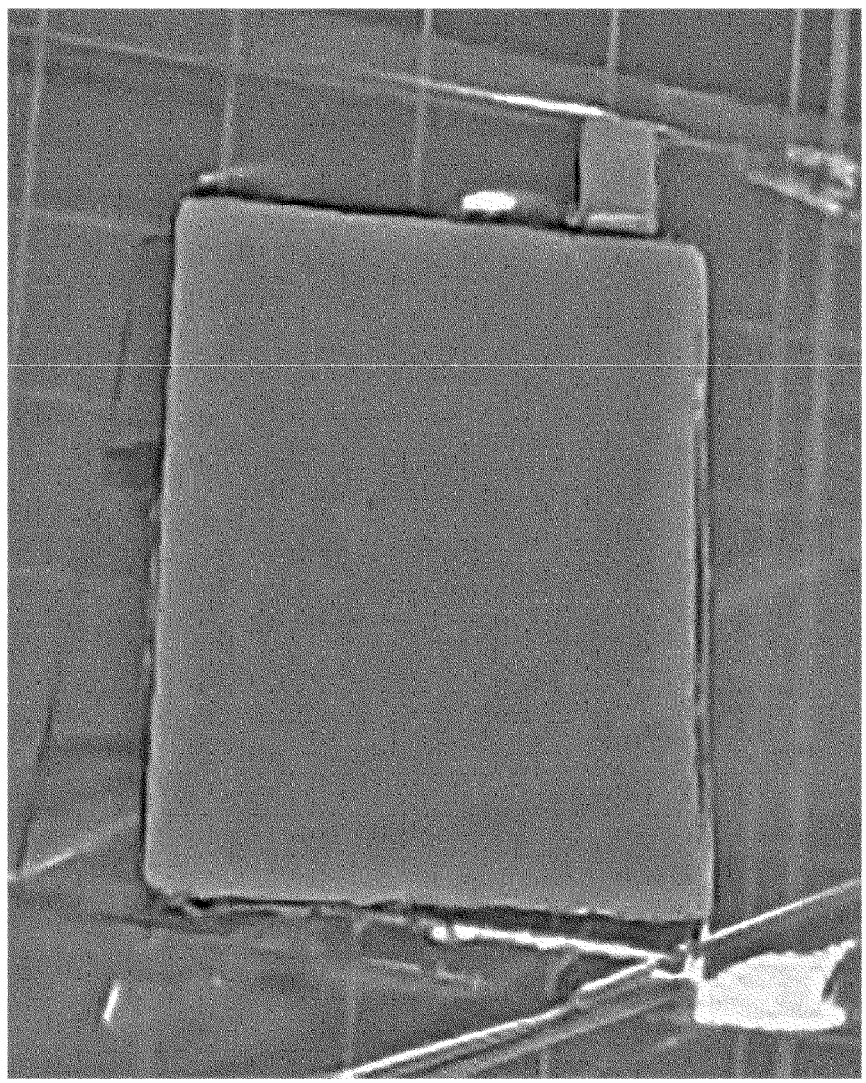
FIG. 3a and FIG. 3b are photographic images illustrating the surface of the negative electrode obtained by disintegrating a battery after carrying out a charge/discharge test in Examples.
Figure 3B:
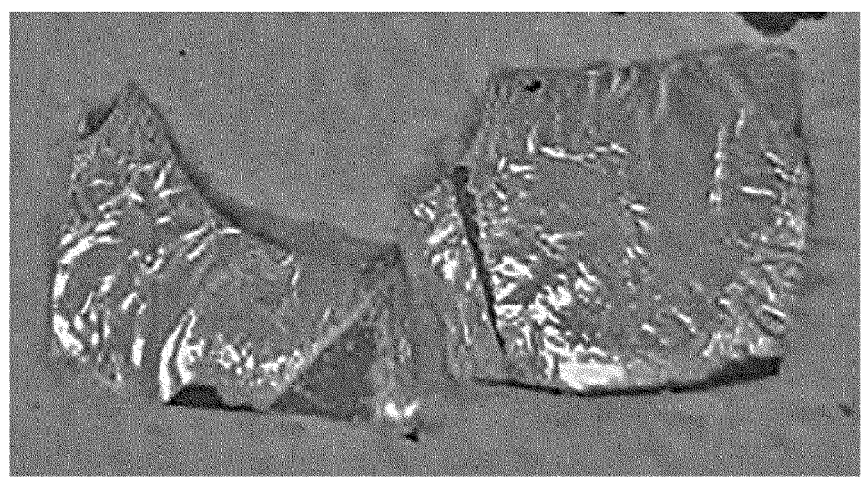
Figure 4A:
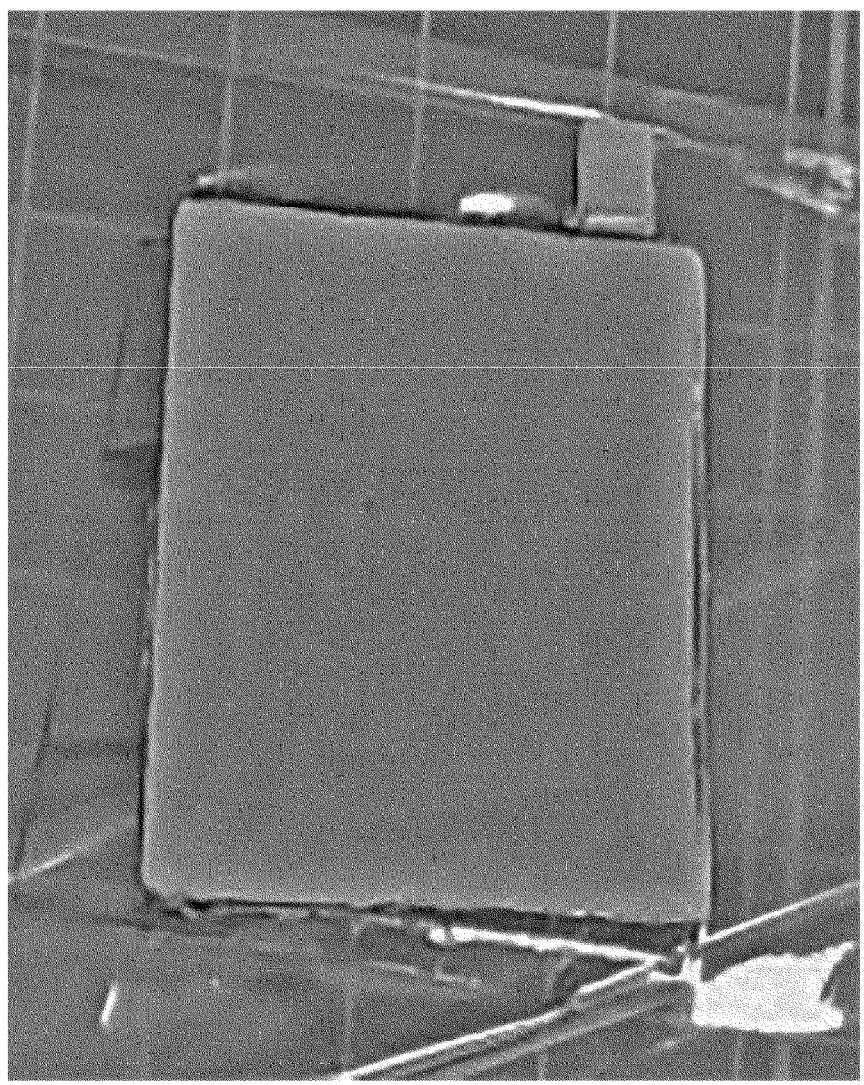
FIG. 4a and FIG. 4b are photographic images illustrating the surface of the negative electrode obtained by disintegrating a battery after carrying out a charge/discharge test in Comparative Examples.
Figure 4B:
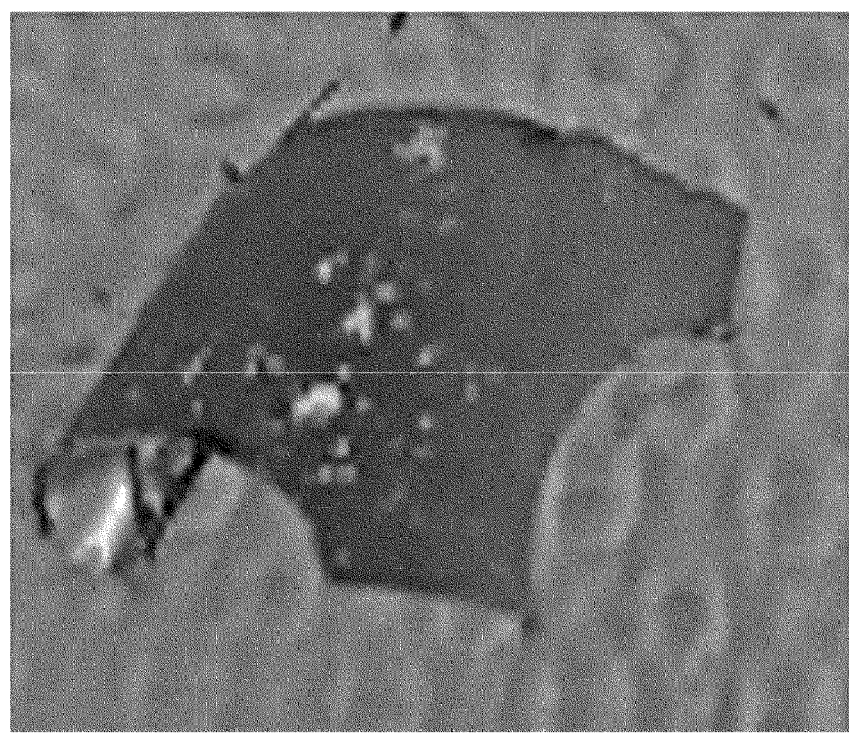

Each of the batteries according to Examples and Comparative Examples was disintegrated to determine the surface and lithiation degree of the negative electrode. FIGS. 4a and 4b are photographic images illustrating the surface of the negative electrode obtained from the battery according to Comparative Example 1. FIGS. 3a and 3b are photographic images illustrating the surface of the negative electrode obtained from the battery according to Example 1. It is shown that the surface of the negative electrode obtained from the battery according to Example 1 has a lithium layer, where residual lithium remains after lithiation. Meanwhile, the lithiation degree of each of the negative electrodes according to Examples and Comparative Examples is determined and the results are shown in the following Table 1. In each of Example 1 and Comparative Example 1, the pre-lithiation degree was determined by carrying out a charge/discharge test, after manufacturing the negative electrode and the battery, and then by disintegrating the battery. In each of Example 2 and Comparative Examples 2-4, the pre-lithiation degree was determined by carrying out a charge/discharge test, after manufacturing the negative electrode, allowing the negative electrode to stand under a vacuum condition for 3 days and manufacturing the battery, and then by disintegrating the battery. In Table 1, 'total dosage' refers to the sum of Li intercalation capacity with solid electrolyte interface (SEI) formation capacity. Herein, Li intercalation capacity may be determined by manufacturing a coin cell using the lithiated negative electrode and lithium foil as a counter electrode, measuring the initial capacity until discharge to 1.5V to obtain capacity of lithium intercalated to the negative electrode. In addition, SEI formation capacity is obtained by subtracting the first irreversible capacity of a coin half-cell using the lithiated negative electrode from the first irreversible capacity of the negative electrode before lithiation.

TABLE 1

|  | Total dosage (mAh/cm$^2$) |
| --- | --- |
| Example 1 | 1.54 |
| Example 2 | 1.55 |
| Comparative Example 1 | 1.55 |
| Comparative Example 2 | 1.45 |
| Comparative Example 3 | 1.49 |
| Comparative Example 4 | 0.4 |

In each of Example 1 and Comparative Example 1, the battery was obtained right after the negative electrode was obtained and the negative electrode showed a similar lithiation degree. However, when comparing Example 2 with Comparative Examples 2-4, where each negative electrode was allowed to stand under vacuum for 3 days before determination of the lithiation degree, each of the batteries according to Comparative Examples showed a significantly lower lithiation degree as compared to Example 2. Particularly, in the case of Comparative Example 4, the negative electrode using an inorganic ingredient retained insulation property so that lithium transport caused by electron transport (i.e. pre-lithiation itself) was limited. As a result, it can be seen that the negative electrode including a lithium diffusion rate-controlling layer according to the present disclosure causes a small loss of lithium before lithiation.

DESCRIPTION OF DRAWING NUMERALS

100: Electrode
110: Current collector
120: Electrode active material layer
130: Lithium diffusion rate-controlling layer
140: Lithium layer
150: Release sheet

What is claimed is:

1. A negative electrode for a lithium secondary battery comprising:
   a current collector;
   an electrode active material layer formed on a surface of the current collector;
   a lithium diffusion rate-controlling layer formed on a surface of the electrode active material layer, which is opposite to the surface of the current collector; and
   a lithium layer containing a lithium metal ingredient and formed on the surface of the lithium diffusion rate-controlling layer, which is opposite to the surface of the electrode active material layer,
   wherein the lithium diffusion rate-controlling layer consists of a polymer material.

2. The negative electrode for a lithium secondary battery according to claim 1, wherein the polymer material comprises a swellable polymer material, an elutable polymer material or both.

3. The negative electrode for a lithium secondary battery according to claim 2, wherein the polymer material comprises the swellable polymer material, and the swellable polymer material shows a swelling degree of 3 or more, as determined by the following Formula 1:

Swelling degree={(Ws−Wd)/Wd}    [Formula 1]

In Formula 1, Wd represents the weight of a polymer material before it is dipped in an electrolyte, and Ws represents the weight of the polymer material 24 hours after it is dipped.

4. The negative electrode for a lithium secondary battery according to claim 2, wherein the polymer material comprises the elutable polymer material, and the elutable polymer material shows a solubility to a carbonate solvent of 1 g/100 mL or more at room temperature, which ranges from about 20° C. to 35° C.

5. The negative electrode for a lithium secondary battery according to claim 1, wherein the electrode active material layer comprises an electrode active material, a binder and a conductive material.

6. The negative electrode for a lithium secondary battery according to claim 1, wherein the electrode active material comprises a metal (metalloid) oxide, and the metal (metalloid) oxide comprises Si, Sn, Al, Sb, Bi, As, Ge, Pb, Zn, Cd, In, Ti, or Ga, or an alloy containing two or more of them.

7. The negative electrode for a lithium secondary battery according to claim 6, wherein the metal (metalloid) oxide is SiO$_x$ (0<x≤2), SnO, SnO$_2$, or a mixture of at least two of them.

8. A lithium secondary battery comprising a negative electrode, a positive electrode, a separator interposed between the negative electrode and the positive electrode, and an electrolyte, wherein the negative electrode is defined in claim 1.

* * * * *